| (12) United States Patent | (10) Patent No.: US 8,566,420 B2 |
|---|---|
| Savinen et al. | (45) Date of Patent: Oct. 22, 2013 |

(54) METHOD AND AN APPARATUS COMPRISING A BROWSER

(75) Inventors: Teppo Savinen, Vihti (FI); Janne Jalkanen, Espoo (FI)

(73) Assignee: Nokia Corporation, Espoo (FI)

( * ) Notice: Subject to any disclaimer, the term of this patent is extended or adjusted under 35 U.S.C. 154(b) by 539 days.

(21) Appl. No.: 12/742,859

(22) PCT Filed: Nov. 13, 2007

(86) PCT No.: PCT/FI2007/000274
§ 371 (c)(1),
(2), (4) Date: Aug. 12, 2010

(87) PCT Pub. No.: WO2009/063121
PCT Pub. Date: May 22, 2009

(65) Prior Publication Data
US 2010/0325236 A1 Dec. 23, 2010

(51) Int. Cl.
*G06F 15/16* (2006.01)
(52) U.S. Cl.
USPC .......... 709/217; 709/206; 709/248; 709/227; 709/223; 455/41.1; 455/411
(58) Field of Classification Search
USPC ......... 709/206, 217, 248, 227, 223; 455/41.1, 455/411
See application file for complete search history.

(56) References Cited

U.S. PATENT DOCUMENTS

| 7,831,717 B2 | 11/2010 | Palin et al. |
|---|---|---|
| 2004/0002305 A1 | 1/2004 | Byman-Kivivuori et al. |
| 2005/0071879 A1 | 3/2005 | Haldavnekar et al. |
| 2005/0092825 A1 | 5/2005 | Cox et al. |
| 2005/0097087 A1 | 5/2005 | Venkata et al. |
| 2005/0136905 A1 | 6/2005 | Son et al. |
| 2005/0193106 A1 | 9/2005 | Desai et al. |
| 2006/0094405 A1 | 5/2006 | Dupont |
| 2006/0168644 A1* | 7/2006 | Richter et al. .................... 726/2 |
| 2006/0289648 A1 | 12/2006 | Shafer |
| 2007/0096909 A1 | 5/2007 | Lally |
| 2007/0109100 A1 | 5/2007 | Jett et al. |

(Continued)

FOREIGN PATENT DOCUMENTS

| CN | 101002454 A | 7/2007 |
|---|---|---|
| CN | 101009505 A | 8/2007 |

(Continued)

OTHER PUBLICATIONS

International Search Report and Written Opinion of the International Searching Authority for corresponding Patent Cooperation Treaty Application No. PCT/FI2007/00274 dated Jul. 8, 2008, 16 pages.

(Continued)

*Primary Examiner* — Wing F Chan
*Assistant Examiner* — Benjamin M Thieu
(74) *Attorney, Agent, or Firm* — Locke Lord LLP

(57) ABSTRACT

Various embodiments of the invention provide the browser of the apparatus with a NFC scripting programming language application protocol interface (API). The NFC scripting programming language API offers the necessary interface for NFC applications to the apparatus's browser. Advantageously the NFC system software can communicate and handshake with browser's scripting programming language engine. In various embodiments of the invention, a suitable scripting programming language extension having the necessary NFC library are included into the browser's scripting programming language library.

16 Claims, 4 Drawing Sheets

(56) References Cited

U.S. PATENT DOCUMENTS

| | | |
|---|---|---|
| 2007/0195760 A1 | 8/2007 | Rahman et al. |
| 2007/0204329 A1 | 8/2007 | Peckover |
| 2007/0266310 A1 | 11/2007 | Sasaki et al. |
| 2008/0220769 A1 | 9/2008 | Qi et al. |
| 2009/0029691 A1 | 1/2009 | Shen et al. |

FOREIGN PATENT DOCUMENTS

| | | | |
|---|---|---|---|
| CN | 101061500 A | | 10/2007 |
| EP | 1347623 | | 9/2003 |
| EP | 1347623 A1 | * | 9/2003 |
| EP | 1954086 | | 8/2008 |
| JP | 2001-307042 | | 11/2001 |
| JP | 2001307042 | | 11/2001 |
| JP | 2002-312726 | | 10/2002 |
| JP | 2002312726 | | 10/2002 |
| JP | 2006-004327 | | 1/2006 |
| JP | 2007-293695 A | | 11/2007 |
| WO | 2004003801 A1 | | 1/2004 |
| WO | 2006111782 A1 | | 10/2006 |
| WO | WO2007058241 | | 5/2007 |
| WO | 2007070188 A2 | | 6/2007 |

OTHER PUBLICATIONS

Supplemental European Search Report and Opinion for corresponding European Patent Application No. 07848143, dated Sep. 30, 2010, 8 pages.

English language machine translation of Japanese Patent Publication No. JP 2001-307042—8 pages.

English language machine translation of Japanese Patent Publication No. JP 2002-312726—19 pages.

English language machine translation of Japanese Patent Publication No. 2001-307042—8 pages.

English language machine translation of Japanese Patent Publication No. 2002-312726—19 pages.

English language machine translation of Japanese Patent Publication No. 2006-004327—13 pages.

Suzuki, N. et al., "Membership service system using multiple contactless IC cards", NTT Cyber Space Laboratories, ISSN 0913-5685, vol. 100, No. 541, Jan. 11, 2001, pp. 33-38.

* cited by examiner

METHOD AND AN APPARATUS COMPRISING A BROWSER

RELATED APPLICATION

This application was originally filed as PCT Application No. PCT/FI2007/000274 filed Nov. 13, 2007, which is incorporated herein by reference in its entirety.

TECHNICAL FIELD OF THE INVENTION

The invention concerns an apparatus comprising a browser application. Furthermore the invention concerns a wireless apparatus comprising a browser application. Yet furthermore the invention concerns a method for operating the apparatuses. Yet furthermore the invention concerns a computer program arranged to run the method when stored on a computer.

BACKGROUND

Modern society has quickly adopted, and become reliant upon, handheld apparatuses for wireless communication. For example, cellular telephones continue to proliferate in the global marketplace due to technological improvements in both the communication quality and device functionality. These wireless communication apparatuses have become common for both personal and business use, allowing users to transmit and receive voice, text and graphical data from a multitude of geographic locations. The communication networks utilized by these apparatuses span different frequencies and cover different transmission distances, each having strengths desirable for various applications. Lately the apparatuses had been engaged with proximity area communications, for example the short-range wireless communications or near field communications etc.

Short-range wireless networks provide communication solutions that avoid some of the problems seen in large cellular networks. Bluetooth™ is an example of a short-range wireless technology quickly gaining acceptance in the marketplace. A 1 Mbps Bluetooth™ radio may transmit and receives data at a rate of 720 Kbps within a range of 10 meters, and may transmit up to 100 meters with additional power boosting. Enhanced data rate (EDR) technology also available may enable maximum asymmetric data rates of 1448 Kbps for a 2 Mbps connection and 2178 Kbps for a 3 Mbps connection. A user does not actively instigate a Bluetooth™ network. Instead, a plurality of devices within operating range of each other may automatically form a network group called a "piconet". Any apparatus may promote itself to the master of the piconet, allowing it to control data exchanges with up to seven "active" slaves and 255 "parked" slaves. Active slaves exchange data based on the clock timing of the master. Parked slaves monitor a beacon signal in order to stay synchronized with the master. These apparatuses continually switch between various active communication and power saving modes in order to transmit data to other piconet members. In addition to Bluetooth™ other popular short-range wireless networks include WLAN (of which "Wi-Fi" local access points communicating in accordance with the IEEE 802.11 standard, is an example), WUSB, UWB and ZigBee (802.15.4, 802.15.4a). All of these wireless mediums have features and advantages that make them appropriate for various applications.

In addition to the above, near field communications technologies, which can be considered for providing very short-range or near to touch communication technologies, have become more interesting lately for providing new use and functionality to wireless communication devices. An example of near field communications technologies comprise Radio Frequency Identification (RFID) technology, which already exists in various consumers applications from transportation and payment systems to various identification systems including implantable RFID tags. Near Field Communication (NFC), is yet another short-range wireless communication technology, which enables the exchange of data between devices over a short distance. The technology is based on RFID, which makes it compatible with the existing contactless infrastructure already in use for public transportation and payment. Near Field Communication (NFC) Forum is a non-profit industry association that promotes the use of NFC short-range wireless interaction in various consumer electronics, wireless devices and PCs. The NFC Forum supports implementation and standardization of NFC technology to make it easier to get information, easier to pay for goods and services, easier to use public transport, and easier to share data between devices.

A wireless apparatus, such as, for example a mobile phone may contain a NFC module or other type of near field communications module. Currently in order to make and use a near field communications application, one actually needs to install the application on the apparatus itself in order to parse and understand the data. Therefore the deployment of these applications can be problematic. Moreover, there are many embedded near field communications applications which might be problematic to use—for example a Secure Element payment application embedded in a smart card may require a specific user interface.

Currently communications operators are trying to build a control point in the smart card by attempting to lock in the handset functionality by adding layers of low-level control. Operators see various near field communication technologies, such as NFC strategically as an important piece in their future offerings. However, since the SIM card does not have a user interface, they cannot achieve the usability levels required for e.g. smart poster-type applications, where the user is directed to touch tags and receive services. A known solution is Java Midlets using JSR-257 and the SmartCard Web Server initiatives. However both known solutions are lacking in functionality. NFC Forum is also defining a WEB RTD, which is a standard which allows a full web site to be put on a smart card. However, this does not give any real interactivity.

SUMMARY

It is the object of the invention to provide the apparatus with convenient interface between proximity area communications with other applications.

In accordance with an aspect of the invention there is provided an apparatus, comprising:
  a processor;
  a proximity area communications module coupled with the processor; and
  a browser, wherein the browser is configured to fetch information including at least scripting programming information, wherein the browser is further configured on a basis of the fetched scripting programming information to enable data communication between the proximity area communications module and the browser.

In accordance with another aspect of the invention there is provided a wireless apparatus, comprising:
  a processor;

a proximity area communications module coupled with the processor; and a browser, wherein the browser is configured to fetch information including at least scripting programming information, wherein the browser is further configured on a basis of the fetched scripting programming information to enable data communication between the proximity area communications module and the browser.

In accordance with yet another aspect of the invention there is provided a method, comprising:

operating a browser, fetching, by the browser, information including at least scripting programming information, and on a basis of the fetched scripting programming information, initiating data communication between a proximity area communications module and the browser.

In accordance with yet another aspect of the invention there is provided a computer program code, wherein the computer program code is arranged to operating a browser, fetching, by the browser, information including at least scripting programming information, and on a basis of the fetched scripting programming information, initiating data communication between a proximity area communications module and the browser.

Various embodiments of the invention provide the browser of the apparatus with a NFC scripting programming information application protocol interface (API). The NFC scripting programming information API offers the necessary interface for NFC applications to the apparatus's browser. Advantageously the NFC system software can communicate and handshake with browser's scripting programming information engine.

In various embodiments of the invention, a suitable scripting programming information extension having the necessary NFC library are included into the browser's scripting programming information library.

Various embodiments of the invention provide a dynamic proximity area communications application environment, wherein any proximity area tag can be applied at the apparatus, and accordingly further commands/content obtained at the apparatus based on the tag. Thus the tags and the apparatus need not be anymore programmed application/tag specific but more universal system can be generated by the embodiments.

Various embodiments of the invention provide easy-to-use application programming environment. The environment is dynamically installable, even over the air (or from a tag). The solution makes the device manufacturer's co-operation with the communications operators a lot easier, because device manufacturers can give operators the opportunity to have their own near field communications user experience without any complicated standards. The operators do not need to modify the lower communication layers. Furthermore there is no need to have preloaded software on the apparatus. The logic can be modified on the fly, even in the server. Even furthermore midlet programming skills are not necessary required.

BRIEF DESCRIPTION OF THE DRAWINGS

Various further embodiments of the invention will now be described, by way of examples only, with reference to the accompanying drawings, in which.

DESCRIPTION OF FURTHER EMBODIMENTS

Figure 1:
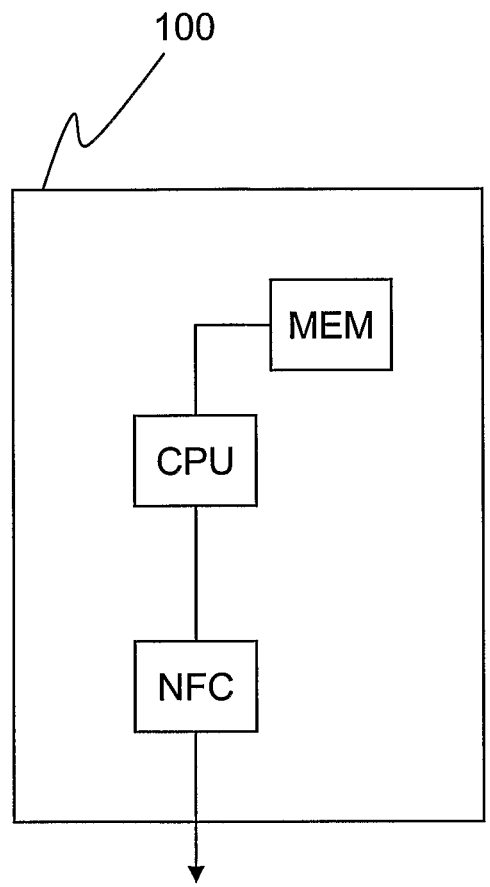
FIG. 1 depicts a block diagram of an apparatus in which general principles of various embodiments of the invention can be applied.

As previously referred FIG. 1 depicts a block diagram of an apparatus in which general principles of various embodiments of the invention can be applied. The apparatus 100 comprises a processor CPU, possibly a memory MEM, which is coupled with the processor. Alternatively the memory may be storage of for example data. The apparatus 100 comprises also a proximity area communications module such as a near field communication module NFC, which is coupled with the processor. Various embodiments of the invention use any type of proximity area communications such as, for example, near field communication, from which NFC communication is an example. The proximity area communications as defined in this context includes any suitable wireless communication technology including, but not limited to radio frequency based communication, optical communication and magnetic-, or inductive coupling that may reach a touch distance, the distance of the same room up to the distance of street level, such as, for example a hailing distance of a user using any available near field communications or short-range communications technology. The proximity area communications module may be, according to a non-limiting embodiment, for example a RFID capable communications module, such as a NFC reader, an optical reader or a Bluetooth radio module etc. Furthermore the apparatus 100 comprises a browser, wherein the browser is configured to fetch information including at least scripting programming information (alternatively referred to as scripting programming language). The browser is further configured on a basis of the fetched scripting programming information to enable data communication between the proximity area communications module and the browser. Further, in an embodiment the browser includes an interface configured according to at least a portion of the scripting programming information stored on the memory MEM to enable data communication between the proximity area communications module NFC and the browser. The apparatus 100 may contain hardware and/or software and/or middleware for carrying out the operations of various embodiments. Thus the apparatus 100, according to an embodiment has computer code and/or the hardware for performing the operations of various aspects embodying the invention. The scripting programming information may reside for example at the memory of the apparatus, at a remotely located web server or within a smart card that may be attached to apparatus, thus there are various physical and logical locations wherein the scripting programming information may be located, and from where it may be fetched to the browser.

Figure 2:
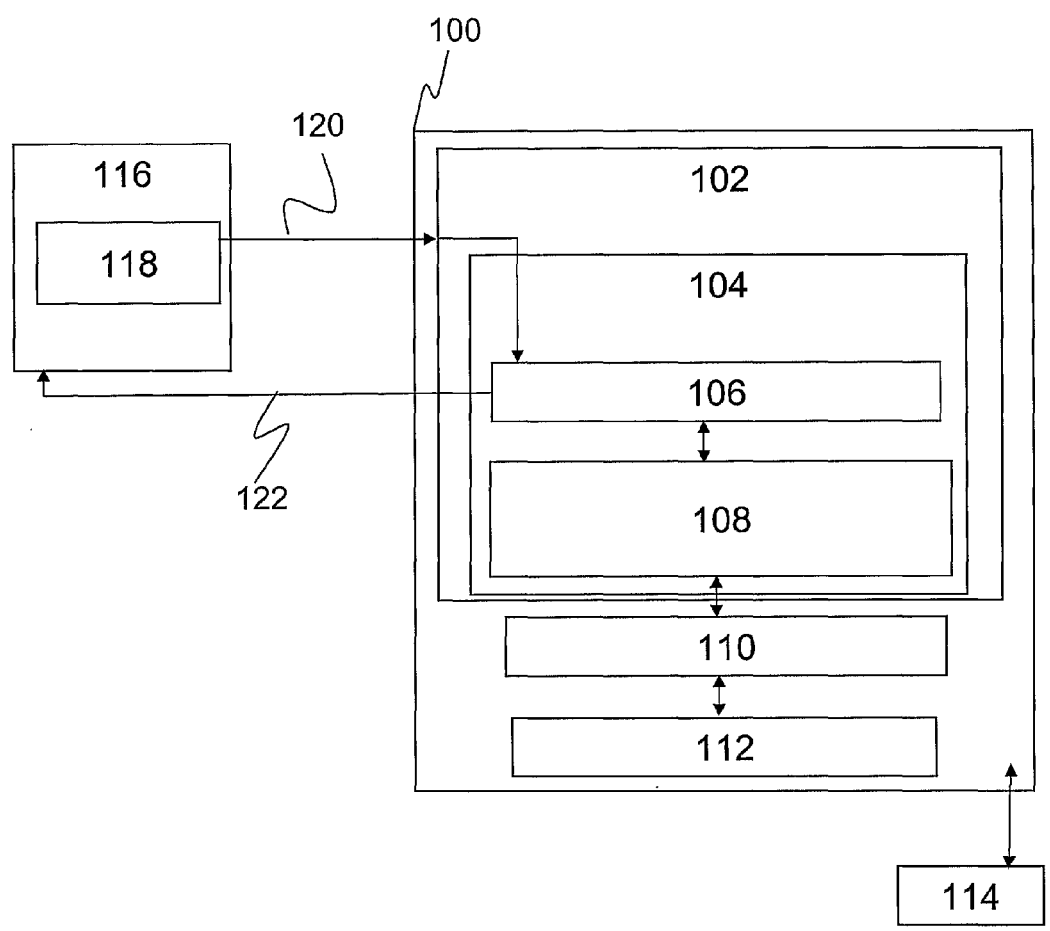
FIG. 2 depicts a block diagram of a near field communications extension to scripting programming language in an apparatus according to an embodiment of the invention.

As referred FIG. 2 depicts the block diagram of the near field communications extension to the scripting programming language according to an embodiment of the invention. The apparatus 100 is depicted.

In various further embodiments, the apparatus 100 may be a wireless radio frequency apparatus having a near field and/or or a short range wireless communication capability. The apparatus 100 can be, according to a further embodiment, a mobile phone containing near field communications capability.

Referring back to FIG. 2, the example of the apparatus 100 comprises the browser 102. An example of the browser can be a mobile browser. The browser 102 comprises a scripting programming language engine 104. An example of the scripting programming language engine 104 may be a JavaScript or EcmaScript engine. Preferably the browser comprises a browser application.

In a further embodiment, the ECMAScript is a scripting programming language, standardized by Ecma International in the ECMA-262 specification, which is accessible through ECMA International website.

Referring back to FIG. 2 the engine 104 comprises a piece of downloaded scripting programming language. This can, for example be a web page based on JavaScript or EcmaScript or the like. The engine 104 comprises also according to an embodiment a near field communications library extension 108 for the scripting programming language. An example of the near field communications library extension 108 is suitable for JavaScript. The near field communications library extension 108 is coupled with the downloaded scripting programming language 106. Advantageously the near field communications library extension 108 allows the downloaded script 106 to access the near field communications functionality. The apparatus 100 comprises also near field communications system software 110. The near field communications library extension 108 is coupled with the near field communications system software 110. The near field communications system software 110 is generally shared by midlets and other applications. The apparatus 100 comprises also near field communications reader hardware 112. The near field communications reader hardware 112 is coupled with the near field communications system software 110. A near field communications tag 114 is coupled with the browser 102, for example by the near field communications reader hardware. An example of the tag 114 can be an RFID tag. The engine has been described in connection with NFC. However it should be noted that it has been described merely as an example of one of proximity area communications module, and accordingly may be embodied in any of these kind of modules or the like.

Still referring to FIG. 2 a server 116 contains scripting programming language content 118. The server 116 may be resided in a web server in a remote location e.g. in Internet or even inside a smart card that is attached to the wireless apparatus. The content 118 may contain for example a web page, an application or a script etc. The content 118 can be downloaded into the browser 102. The browser may make a request, a confirmation etc. by the processed data 122 to the web server 116.

Various embodiments of the invention use any type of proximity area communications such as, for example, near field communication, from which NFC communication is an example. The proximity area communications may reach a touch distance, the distance of the same room until the street level such as hailing distance of a user and use any available near field communications or short-range communications technology. NFC is a short-range wireless technology which enables the communication between devices over a short distance over various mediums including RF and optical communications. NFC communication, on the other hand, is compatible with the existing contactless infrastructure, for example in use for public transportation and payment. NFC works by magnetic field induction. It can operate within the globally available and unlicensed RF band of 13.56 MHz. Working distance can be 0-20 centimetres, and the speed: 106 Kbit/s, 212 Kbit/s or 424 Kbit/s. Generally there are two modes: Passive Communication Mode: The Initiator device provides a carrier field and the target device answers by modulating existing field. In this mode, the Target device may draw its operating power from the Initiator-provided electromagnetic field, thus making the Target device a transponder. Active Communication Mode: Both Initiator and Target device communicate by generating their own field. In this mode, both devices typically need to have a power supply. NFC can be used to configure and initiate other wireless network connections such as Bluetooth, Wi-Fi or Ultra-wideband. Use cases for NFC may for example be: Card emulation: the NFC device behaves like an existing contactless card. Reader mode: the NFC device is active and read a passive RFID tag, for example for interactive advertising. P2P mode: two NFC devices are communicating together and exchanging information. Plenty of applications will be possible such as: Mobile ticketing in public transport—an extension of the existing contactless infrastructure. Mobile Payment—the mobile phone acts as a debit/credit payment card. Smart poster—the mobile phone is used to read RFID tags on outdoor billboards in order to get info on the move.

Pairing—in the pairing of devices with NFC support may be as easy as bringing them close together and accepting the pairing. The process of activating on both sides, searching, waiting, pairing and authorization can be replaced by a simple "touch" of the mobile phones. Other applications in the could include: Electronic tickets—airline tickets, concert/event tickets, and others, Electronic money, Travel cards, Identity documents, Mobile commerce, Electronic keys—car keys, house/office keys, hotel room keys, etc NFC is an open platform technology standardized in ECMA-340 and ISO/IEC 18092. These standards specify the modulation schemes, coding, transfer speeds and frame format of the RF interface of NFC devices, as well as initialization schemes and conditions required for data collision-control during initialization-for both passive and active NFC modes. Furthermore, they also define the transport protocol, including protocol activation and data-exchange methods. NFC incorporates a variety of pre-existing standards including ISO_14443 both A (normal) and B (banking/short range), ISO_15693, and FeliCa.

Some embodiments of the invention apply scripting programming information. An example of the scripting programming information is scripting programming language. Scripting languages, also called script languages, are programming languages that are interpreted or compiled each time they run. Scripts are executed directly from their source code, which are generally text files containing language specific markup. Thus, "scripts" are often treated as distinct from "programs", which are typically compiled from source code into binary executable files (i.e. machine code) only after they are changed, and are then run from these binary files without needing the source code.

Scripts were created to shorten the traditional edit-compile-link-run process. The name "script" is derived from the written script of the performing arts, in which dialogue is set down to be interpreted by the specific languages interpreter program. Scripting languages can also be compiled, if a compiler has been developed for the language, but interpretation is more common because that is the intended use of a scripting language.

Some scripting languages are part of a larger system, embedded in and dependent on it.

Some embodiments of the invention use JavaScript. JavaScript is an example of a scripting programming language. It is most often used for client-side web development. JavaScript is an implementation of the ECMAScript standard. JavaScript is a dynamic, weakly typed, prototype-based language with first-class functions. JavaScript was influenced by many languages and was designed to have a similar look to Java, but be easier for non-programmers to work with. The language is best known for its use in websites (as client-side JavaScript), but is also advantageously used to enable scripting access to objects embedded in other applications. Despite the name, JavaScript can be unrelated to the Java programming language; though both have a common debt to C syntax. JavaScript is a registered trademark of Sun Microsystems, Inc.

Some embodiments of the invention use ECMAScript. ECMAScript is an example of a scripting programming language, standardized by Ecma International in the ECMA-262 specification. The language is widely used on the web, and is often referred to as JavaScript or JScript, after the two primary implementations of the specification. ECMAScript is supported in many applications, especially web browsers. ECMAScript may be commonly called JavaScript in the web browser. Dialects typically include their own, different standard libraries, of which some can be standardized separately—such as the W3C-specified DOM. Some implementations, such as ActionScript used in Flash, have a completely different set of libraries. This means that applications written in one dialect of ECMAScript will not likely work in another, unless of course they are designed to be compatible.

Figure 3:
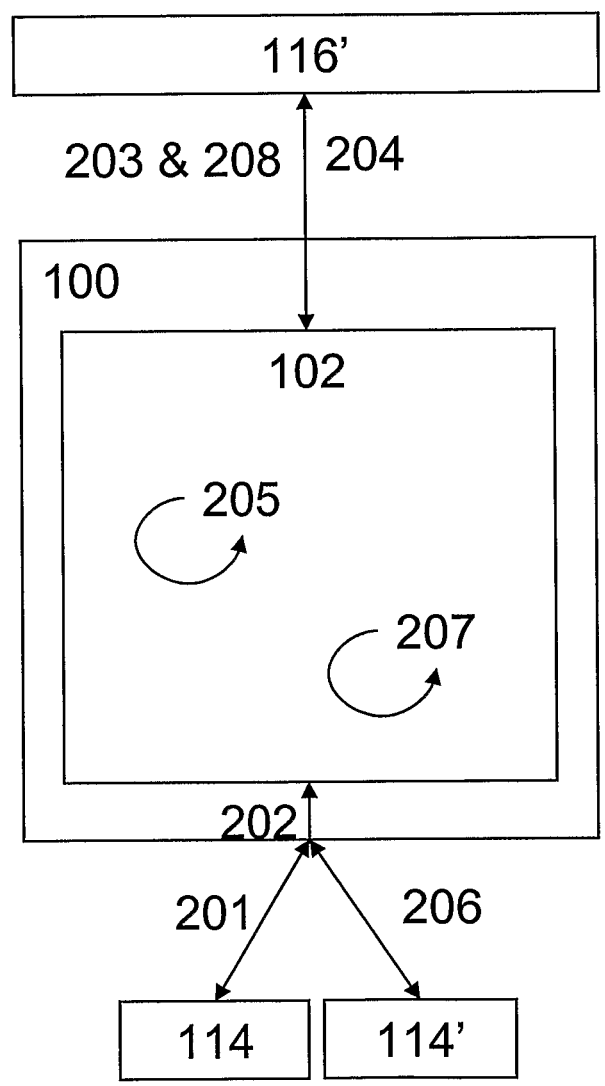
FIG. 3 depicts a generic usage pattern according to an embodiment of the invention.

Referring to FIG. 3 a generic usage pattern according to an embodiment of the invention is depicted. In the step 201 a user touches the tag 114. A browser 102 is launched in the step 202. The launch may be triggered by the touch. In the step 203 the browser contacts an URL, which is specified in the tag 114. The content 118 (e.g. the Web page) with embedded scripting programming language is loaded to the browser 102 in the step 204. The downloaded content 106 guides user to touch the tag 114 or 114' in the step 205. In the step 206 the user touches the tag 114 or 114'. The scripting programming language processes the information from the tag 114, 114' locally and interacts with the user in the step 207. In the step 208 the processed data 122 is posted to the server 116.

In various further use scenarios near field communications reader 112 may be RFID reader. The RFID reader can read the tag 114. Advantageously the tag 114 contains for example an URL or a corresponding path, which triggers the browser 102 of the apparatus 100. Thus the browser 102 can be advantageously triggered on a basis of reading the tag 114. Accordingly the browser 102 connects to the destination of the path. The destination may, for example contain html based content. Furthermore the destination may contain a script having the needed functions, which enable the interface to and between the near field communications module. Accordingly various further embodiments of the invention the user of the apparatus 100 does not need to manually save the script (and the address of the destination). Advantageously the connection establishment can take place automatically. Additionally the service provider can offer the desired "look and feel" to the user by various further embodiments. For example VISA logo and/or theme song can be provided to the user in case of payment action regarding VISA application etc. In the case that the web server 116', into which the tag refers to, is the sim card of the apparatus 100, a local payment activity may be performed. Alternatively the sim may be more general smart card, for example a secure element. Thus the payment may be carried out by the visa payment application enabling local payment without a contact into the payment server or the payment network. Furthermore, for example updates can take place easily as the necessary information for interpreting the information read from a near field communications tag or any other proximity communications entity can be updated in the browser by simply fetching the information including at least scripting programming information, on a basis of which, the browser may be re-configured. The javascript and the browser are generally platform independent so that the apparatuses and the parts of the apparatuses and the system can operate by generally the same instructions without a need for more special individual tuning, which is necessary in the manual updating without the tag and the interface. So, according to an embodiment of the present invention, information read from e.g. a near field communications tag can be interpreted differently on the basis of the configuration of the browser so that in initial configuration the browser may perform a first operation upon reading the information, and after an update of the browser, a second, different than the first operation can be performed by the browser upon reading the information. With this kind of operation, the functionalities of the apparatuses can be updated over the air without needing to perform any manual operations for the update and provides enhanced means for tailoring apparatuses based on personal needs of a service provider or operator.

In various further use scenarios, the user may obtain for example product information by touching the tag 114. The browser 102 connects accordingly with the server 116 with the aid of the convenient near field communications interface, and the browser 102 can perform the content, which relates to the tag 114. For example shopping may be provided conveniently for the user of the apparatus 100.

In various further use scenarios the user of the apparatus 100 can trigger the connection into the server 116 by touching the tag 114. Accordingly the interface between the near field communication and the server can be triggered by touching the tag 114.

Figure 4:
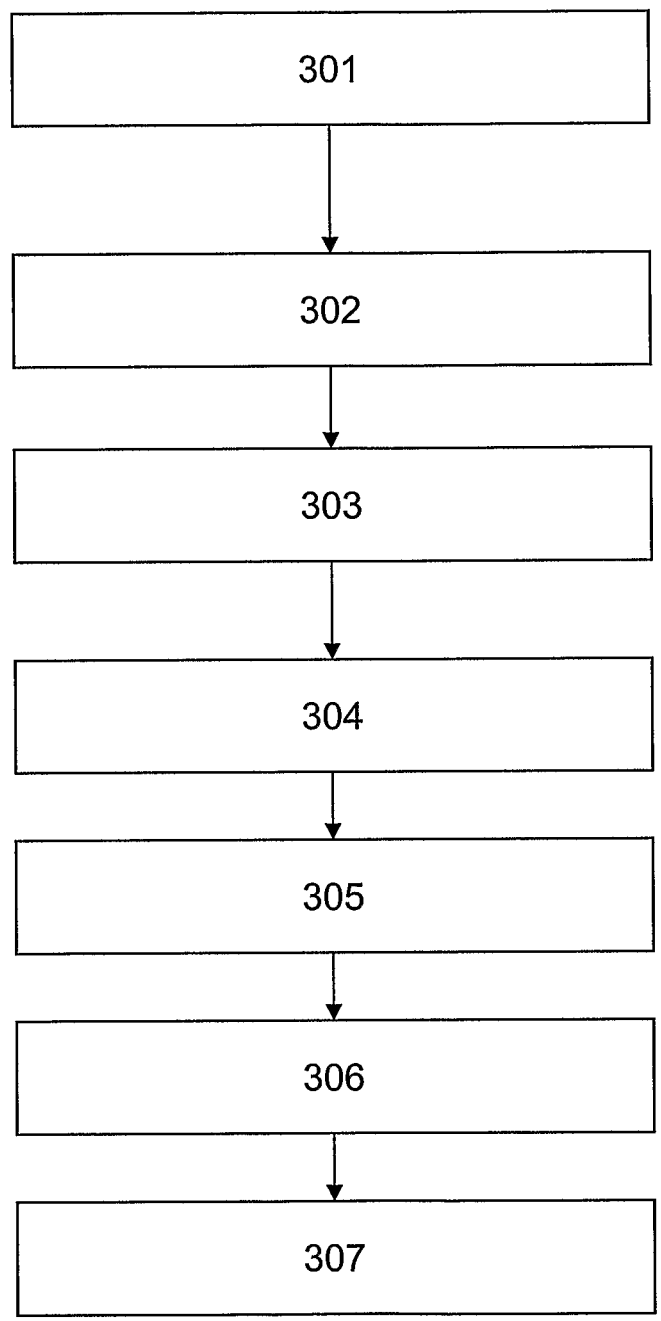
FIG. 4 depicts examples of scripting programming language functions according to an embodiment of the invention.

Referring now to FIG. 4, there is depicted examples of Scripting programming language functions according to an embodiment of the invention relating especially to NFC communication. However, it should be noted that the various steps of figure apply also to other proximity communication technologies. In the step 301 there is a register for NFC events. NFC events are received in the step 302. A connection is opened to the tag 114 (step 303). Data is read from tag (step 304).

In the step 305 data is written to the tag 114. NDEF formatting functions take place in the step 306. NDEF is an example of the data format defined for NFC communications. In the step 307 NFC events are unregistered.

A further embodiment of the invention takes advantage of smart card user interface such as, for example, the subscriber identity module (SIM) card user interface (UI). Generally the smart card or SIM card may be an SD card or actually any other auxiliary secure element. In the further embodiment the smart card or SIM card contains the web server 116. This can be based on, for example the Smart Card Web Server Standard (SCWS). Thus a small web server can be advantageously installed into the smart card or the SIM. The communications operator may now deploy a small SCWS servlet. The SCWS servlet contains JavaScript, which can be advantageously used to control the NFC functionality, for example as described in various embodiment of the invention. Advantageously the operator can have the control of the NFC functionality through the regular smart card or SIM interface, even without the need to use low level HCl standards. Furthermore operator can have a relatively easy deployment of the NFC services. Furthermore various further embodiments of the invention do not actually require an internet connection. This means, for no costs to the user. The further embodiment is relatively easy to deploy into the apparatus, thereby no significant cost may occur.

Another further embodiment of the invention uses an embedded web server. The tag 114' itself can advantageously contain a web server 116' (or an equivalent, e.g. via using the NFC Forum Web RTD). When using the further embodiment, upon a trigger such as a touch, the browser is launched. The contents of the tag 114' can be shown. With the JavaScript routines in place, the contents of the tag 114' can directly guide the user to e.g. touch the tag 114' again. In an alternative further embodiment, the script can guide the user to touch another tag 114". The function of the tag can be changed. For example in a bus station: a first touch: "Find route", a second touch: "Choose city" etc. Advantageously all can be done locally, and there is no need to connect to the internet, if not desired to do that Another further embodiment of the invention can relate to the traditional phone operations. For example a sms message and the destination can be obtained from the tag with the aid of the fetched scripting language that enables data communication between the proximity area communications module and the browser. User touches the tag and accordingly the browser is capable receiving a sms message. For another example, a call can be activated by reading the tag. E.g. user touches a tag and the apparatus accordingly dials into the destination specified by the content of tag.

Yet another further embodiment of the invention use widgets. Widgets are small pieces of JavaScript or HTML. Widgets are downloaded into the apparatus 100. Widgets stay in the apparatus 100 until called upon. The browser 102 is an execution environment of the widgets. The widgets can be equivalent to the Apple Dashboard. Advantageously the built-in software can be replaced by using equivalent Widgets. One has to register to the NFC events. User may easily mix-n-match which NFC functionality he wants, using his browser. All new RTD support e.g. could be done using the browser. The further embodiment is also relatively easy to deploy. Some tags can even request an installation before running (for example touch here to install this widget).

In various embodiments of the invention the computer program can be a computer program product. The computer program product is an example of a tangible object. For example, it can be a medium such as a disc, a hard disk, an optical medium, CD-ROM, floppy disk, or the like storage etc. In another example the product may in a form of a signal such as an electromagnetic signal. The signal can be transmitted within the network for example. The product comprises computer program code or code means arranged to perform the operations of various embodiments of the invention.

Ramifications and Scope

Although the description above contains many specifics, these are merely provided to illustrate the invention and should not be construed as limitations of the invention's scope. It should be also noted that the many specifics can be combined in various ways in a single or multiple embodiments. Thus it will be apparent to those skilled in the art that various modifications and variations can be made in the apparatuses and processes of the present invention without departing from the spirit or scope of the invention.

The invention claimed is:

1. An apparatus, comprising:
  a processor;
  a proximity area communications module coupled with the processor and configured to communicate with a machine readable target; and
  a browser, wherein the browser is configured to fetch information including at least scripting programming information to configure the browser, wherein the browser is further configured, on a basis of the fetched scripting programming information, to interpret data received via the proximity area communications module;
  wherein the proximity area communications module is further configured to read information from the machine readable target that triggers the browser to create an Internet connection to fetch the information including at least scripting programming information to configure the browser according to a content of the machine readable target; and
  wherein the proximity area communications module comprises a near field communications module.

2. An apparatus according to claim 1, wherein the browser is further configured according to the at least scripting programming information to register to receive data via the proximity area communications module.

3. An apparatus according to claim 1, wherein the browser is further configured according to the at least scripting programming information to register to provide data via the proximity area communications module.

4. An apparatus according to claim 1, wherein the browser further comprises a near field communication library including a scripting programming information extension according to the fetched scripting programming information.

5. An apparatus according to claim 4, wherein the browser is further configured to fetch said library including the scripting programming information extension via an Internet connection.

6. An apparatus according to claim 1, wherein the browser is arranged to make a connection to internet.

7. An apparatus according to claim 1, further comprising a smart card containing the scripting programming information that is configured to be downloaded into the apparatus to configure the browser to interpret data received via the proximity area communications module.

8. An apparatus according to claim 7, wherein the smart card comprises a subscriber identification module.

9. An apparatus according to claim 7, wherein the smart card contains at least one piece of scripting programming information so that it can be downloaded into the apparatus and be stored therein until called upon by the browser.

10. An apparatus according to claim 1, wherein the proximity area communications module comprises at least one of a Bluetooth communications module, an ultra wide-band communications module, a zigbee communications module, an infrared communications module, or a radio frequency identification communications module.

11. A method, comprising:
  launching a browser,
  fetching, by the browser, information including at least scripting programming information for configuring the browser, and
  on a basis of the fetched scripting programming information, interpreting data received via a proximity area communications module;
  wherein the proximity area communications module is further configured to read information from a machine readable target that triggers the browser to create an Internet connection to fetch the information including at least scripting programming information for configuring the browser according to a content of the machine readable target; and
  wherein the proximity area communications module comprises a near field communications module.

12. A method according to claim 11, further comprising registering, by the browser, according to the at least scripting programming information to receive data via the proximity area communications module.

13. A method according to claim 11, further comprising registering, by the browser, according to the at least scripting programming information to provide data via the proximity area communications module.

14. A method according to claim 11, wherein a machine readable target triggers the browser to make a connection according to the content of the machine readable target.

15. A method according to claim 11, wherein the scripting programming information can be updated.

16. A computer program product comprising a non-transitory computer usable medium having computer readable program code embodied in said medium, which when executed by a processor causes an apparatus to:
    launch a browser,
    fetch, by way of the browser, information including at least scripting programming information for configuring the browser, and
    on a basis of the fetched scripting programming information, interpret data received via a proximity area communications module,
    wherein the proximity area communications module is further configured to read information from a machine readable target that triggers the browser to create an Internet connection to fetch the information including at least scripting programming information to configure the browser according to a content of the machine readable target, and
    wherein the proximity area communications module comprises a near field communications module.

* * * * *